United States Patent [19]

Takahashi

[11] Patent Number: 5,239,471
[45] Date of Patent: Aug. 24, 1993

[54] ACTIVELY CONTROLLED SUSPENSION SYSTEM FOR AUTOMOTIVE VEHICLES

[75] Inventor: Kenro Takahashi, Kanagawa, Japan

[73] Assignee: Nissan Motor Co., Ltd., Japan

[21] Appl. No.: 663,125

[22] Filed: Mar. 4, 1991

[30] Foreign Application Priority Data

Mar. 6, 1990 [JP] Japan .................................. 2-54402

[51] Int. Cl.⁵ .......................................... B60G 17/015
[52] U.S. Cl. ............................... 364/424.05; 280/707; 280/714
[58] Field of Search ..................... 364/424.05; 280/707, 280/714, 709, 6.1, 840

[56] References Cited

U.S. PATENT DOCUMENTS

| | | | |
|---|---|---|---|
| 4,850,461 | 7/1989 | Rubel | 280/714 X |
| 4,867,476 | 9/1989 | Yamanaka et al. | 280/714 |
| 4,943,084 | 7/1990 | Fukunaga et al. | 280/707 |
| 4,971,353 | 11/1990 | Buma et al. | 280/707 |
| 4,973,079 | 11/1990 | Tsukamoto | 280/707 |
| 4,973,080 | 11/1990 | Ikemoto et al. | 280/707 |
| 4,982,979 | 1/1991 | Akatsu et al. | 280/707 |
| 5,015,007 | 5/1991 | Uchiyama et al. | 280/707 |
| 5,020,826 | 6/1991 | Stecklein et al. | 280/707 |
| 5,042,834 | 8/1991 | Yonekawa et al. | 280/707 |

FOREIGN PATENT DOCUMENTS

0249227A2 12/1987 European Pat. Off. .
62-292517 12/1987 Japan .

Primary Examiner—Thomas G. Black
Assistant Examiner—Collin W. Park
Attorney, Agent, or Firm—Lowe, Price, LeBlanc & Becker

[57] ABSTRACT

An actively controlled automotive suspension system comprises a hydraulic cylinder disposed between a vehicle body and a suspension member pivotably mounted on the vehicle body, a pressurized fluid source connected to the hydraulic cylinder, a pressure accumulator connected to the hydraulic cylinder for absorbing pressure fluctuation in the hydraulic cylinder, a variable throttling orifice, interposed between the hydraulic cylinder and the accumulator, for variably restricting fluid flow, a pressure control valve for adjusting fluid pressure in the hydraulic cylinder, sensors for monitoring state of a vehicular attitude change, and a controller associated with both of the pressure control valve and the variable throttling orifice for controlling magnitude of fluid pressure in the hydraulic and a throttling ratio of the throttling orifice.

8 Claims, 8 Drawing Sheets

ACTIVELY CONTROLLED SUSPENSION SYSTEM FOR AUTOMOTIVE VEHICLES

BACKGROUND OF THE INVENTION

1. Field of the Invention

The present invention relates to an actively controlled automotive suspension system which is capable of actively varying suspension characteristics. Specifically to technologies for effectively suppressing vehicular body attitude change, such as rolling, pitching, bouncing or so forth.

2. Description of the Background Art

Recently, there have been proposed and developed various active suspension systems which act in an active manner for suppressing vehicular body attitude change according to vehicle driving condition and thus achieves both of riding comfort and driving stability. Prior art active suspension systems traditionally comprises a fluid pressure operated cylinder, for example a hydraulic cylinder, interposed between a vehicle body and a suspension member, a fluid pressure control valve communicated with a pressure chamber in the cylinder for adjusting working fluid pressure in the pressure chamber, a pressure accumulator connected through a fixed throttling orifice to the pressure chamber of the cylinder, a plurality of sensors for monitoring vehicular body attitude change, and a controller for controlling the pressure control valve based on the vehicular body attitude change signal value from the sensors. Such conventional active suspension systems are constructed such that damping force created by a first fluid pressure system including the pressure control valve becomes larger than or equal to that created by a second fluid pressure system including both of the pressure accumulator and the fixed throttling orifice, when vibration input from the suspension member to the cylinder is greater than or equal to a predetermined frequency.

As is generally known, the conventional active suspension system operates in such a manner as to suppress the vehicular attitude change by actuation of the pressure control valve, when fluid pressure fluctuation in the pressure chamber of the fluid pressure operated cylinder occurs due to a relatively low frequency vibration at around a resonance frequency for a sprung mass (corresponding to the vehicular body) at which the vehicle experiences a great attitude change. In addition, the conventional active suspension system operates in such a manner as to absorb the input vibration by the pressure accumulator with damping created due to flow restriction action of the fixed throttling orifice, when the pressure fluctuation in the cylinder occurs due to a relatively high frequency vibration input at around a resonance frequency for an unsprung mass (corresponding to the suspension member). One such conventional active suspension system has been disclosed in Japanese Patent First Publication (Tokkai) Showa 62-292517.

In the previously noted conventional active suspension systems, the orifice provided between the cylinder and the accumulator has a fixed throttling characteristics. A throttling rate of the orifice is fixed and tuned effectively to damp pressure fluctuation in the pressure chamber in the cylinder, occurring due to a relatively high frequency vibration (at around a resonance frequency for the sprung mass) input from the suspension member. On the other hand, a fluid resistance of the first fluid pressure system is determined depending upon both of the input vibration frequency and a boundary frequency defining a boundary between two resonance frequencies for the sprung mass and the unsprung mass. That is, when the input vibration frequency is less than the boundary frequency, the pressure control valve is controlled such that the fluid resistance in the first fluid pressure system becomes less than that of the second fluid pressure system including the orifice so as to facilitate or promote changes in fluid pressure in the pressure chamber. When the input vibration frequency is greater than or equal to the boundary frequency, the pressure control valve is also controlled such that the fluid resistance in the first fluid pressure system exceeds that of the second fluid pressure system including the orifice so as to prevent fluid pressure fluctuation in the pressure chamber. As is well known, since a fluid flow passage area in the first fluid pressure system is essentially increased due to decreasing in the fluid resistance, a fluid flow velocity flowing through the fluid passage of the first fluid pressure system is decreased. Therefore, the conventional active suspension systems have a relatively low responsiveness with regard to the pressure control operation for the fluid pressure operated cylinder in various low frequency vibration modes (at around the resonance frequency for the sprung mass), for example rolling and pitching.

SUMMARY OF THE INVENTION

It is, therefore in view of the above disadvantages, an object of the present invention to provide an actively controlled suspension system which can achieve higher driving stability and riding comfort by vehicular body attitude control with a high responsiveness.

It is another object of the invention to provide an actively controlled suspension system which insures a high step-response for a pressure control in a fluid pressure operated actuator even if the fluid operated actuator receives the input vibration at around a resonance frequency for a sprung mass of the vehicle as well as a resonance frequency for an unsprung mass.

In order to accomplish the aforementioned and other objects, an actively controlled automotive suspension system, comprises a fluid pressure operated actuator disposed between a vehicle body and a suspension member pivotably mounted on the vehicle body and rotatably supporting a vehicle wheel, the fluid pressure operated actuator filled with a working fluid, a pressurized fluid source connected to the fluid pressure operated actuator for supplying the working fluid in a pressurized fashion, a pressure accumulator connected to the fluid pressure operated actuator for absorbing pressure fluctuation in the fluid pressure operated actuator, a variable throttling means, interposed between the pressure accumulator and the fluid pressure operated actuator, for variably restricting fluid flow in a hydraulic circuit defined between the pressure accumulator and the fluid pressure operated actuator, first means, associated with the fluid pressure operated actuator, for adjusting fluid pressure in the fluid pressure operated actuator, second means for monitoring state of a vehicular attitude change for generating a vehicular attitude change signal representative both of magnitude and direction of the vehicular attitude change, third means, associated with the first and second means, for determining magnitude of fluid pressure to be adjusted in the fluid pressure operated actuator on the basis of the vehicular attitude change signal so as to suppressing the vehicular attitude change, fourth means, associated with the second means, for determining a degree of transient oscillating state of the vehicular body on the basis of the vehicular attitude change signal, and fifth means, associated with the variable throttling means and the fourth means, for variably controlling a throttling ratio of the variable throttling means in response to the degree of transient oscillating state determined by the fourth means.

The variable throttling means may comprise a two-position valve having a first fluid passage employing a fixed throttling orifice and a second fluid passage employing a spool valve employed therein, which spool valve acts in a fully open position wherein full fluid flow through the second fluid passage is provided and in a fully closed position wherein fluid flow through the second fluid passage is blocked, and a fixed throttling valve connected to both of the first and second fluid passage. The variable throttling means may comprise a variable throttling valve being capable of sequentially varying its throttling ratio and a fixed throttling valve connected to the variable throttling valve in parallel to each other.

The first means may comprise a fluid pressure control valve supplying a control fluid pressure to the fluid pressure operated actuator. The fluid pressure control valve includes an electromagnetic solenoid valve.

The second means may comprise a lateral acceleration sensor for monitoring a lateral acceleration of the vehicular body and a longitudinal acceleration sensor for monitoring a longitudinal acceleration of the vehicular body.

The fifth means may control the throttling ratio in such a manner that the throttling ratio is held at a low level when the degree of transient oscillating state is less than a predetermined threshold and the throttling ratio is held at a high level when the degree of transient oscillating state is greater than or equal to the predetermined threshold. Alternatively, the fifth means may control the throttling ratio in such a manner that the throttling ratio is sequentially varied in proportion to the degree of transient oscillating state.

DESCRIPTION OF THE PREFERRED EMBODIMENT

Figure 1:
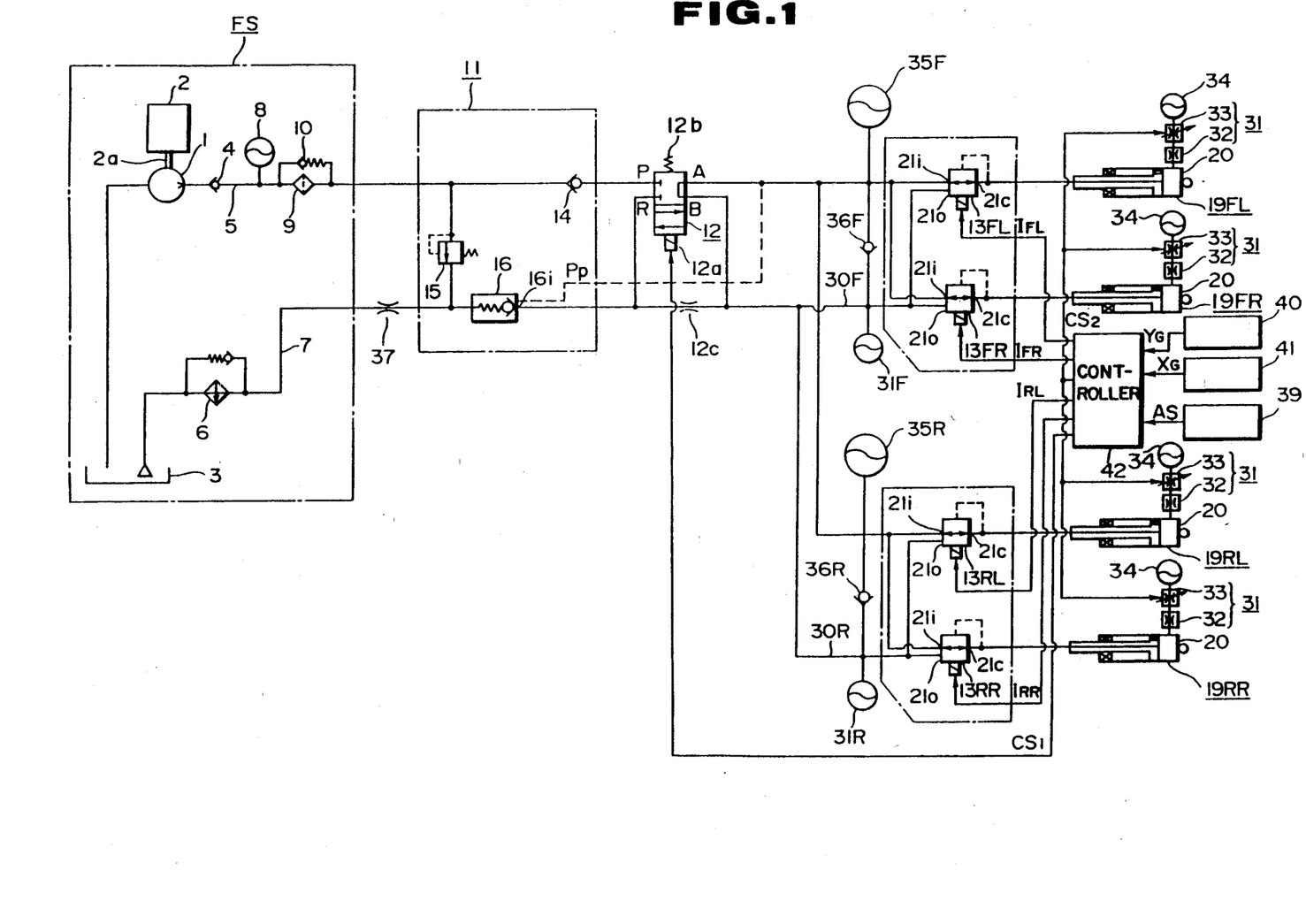
FIG. 1 is a hydraulic circuit diagram illustrating a first embodiment of the active suspension system according to the invention.

Referring now to the drawings, particularly to FIG. 1, the preferred embodiment of an active suspension system according to the invention has a fluid pressure supplying system FS. The system FS includes a hydraulic pump 1 having a driven connection with an engine 2 serving as a driving source. The pump 2 is rotatably connected to an output shaft 2a of the engine 2. The inlet port of the pump 2 is connected to an oil reservoir 3, and while the outlet port of the pump 3 is connected through a check valve 4 to a working fluid supply line 5. The system FS also includes an oil cooler 6 provided in a working fluid return line 7. A pressure accumulator 8 is connected to the supply line 5 for absorbing pulsation due to pulsating fluid flow occurring in the supply line 5. The system FS also employs an oil filter 9 downstream of the accumulator 8 and a bypass fluid passage 10 provided in parallel with the filter 9 so as to assure stable fluid flow even if the filter 9 is bunged up. The ends of the supply line 5 and the return line 7 are respectively connected through a fluid pressure maintaining section 11 and a fail-safe valve 12, which valve 12 serves as an opening and closing valve, to the inlet ports and outlet ports of pressure control valves 13FL, 13FR, 13RL and 13RR respectively associated with front-left, front-right, rear-left and rear-rear wheels.

The fluid pressure maintaining section 11 is composed of a one-way check valve 14 provided in the supply line 5, a pressure relief valve 15 interposed between both of the supply line 5 and the return line 7, for setting a standard line pressure $P_H$, and a pilot operated check valve 16 receiving the line pressure downstream of the fail-safe valve 12, i.e., in the inlet port side of the pressure control valves 13FL–13RR, as a pilot pressure $P_P$. The check valve 16 operates in such a manner as to keep the return line 7 in an open state by releasing its check valve function, when the pilot pressure $P_P$ is greater than or equal to a predetermined neutral pressure $P_N$ and in such a manner as to keep the return line 7 in a closed state by establishing the check valve function, when the pilot pressure $P_p$ is less than the neutral pressure $P_N$.

The fail-safe valve 12 is comprised of a four-port two-position spring offset valve serving as an electromagnetic solenoid valve and an electromagnetic solenoid 12a. The fail-safe valve 12 employs four ports P, R, A and B. The port P is connected to the downstream side of the check valve 14. The port R is connected to an inlet port 16i of the pilot operated check valve 16. The port A is connected to inlet ports 21i of the pressure control valves 13FL–13RR. The port B is connected to drain ports 21o of the pressure control valves 13FL–13RR. The fail-safe valve 12 acts in such a manner as to keep a normal position thereof by means of a return spring 12b in the absence of a control signal $CS_1$ from a controller which will be described herebelow in detail, to the solenoid 12a and acts in such a manner as to keep an offset position thereof in the presence of the control signal $CS_1$. In the previously noted normal position, communication between two ports P and R is blocked and communication between two ports A and B is established. In the offset position, two pairs of ports P and A, and R and B are respectively communicated to each other. In addition, the ports R and B are communicated to each other through a fixed throttling orifice 12c provided in the return line 7.

Each of the pressure control valves 13FL–13RR has the inlet port 21i, the drain port 21o, and a control pressure sypplying port 21c for supplying a control pressure to the associated fluid pressure operated cylinder, such as a hydraulic cylinder. Each of the pressure control valves also includes a spool slidingly moved therein for switching communication between the respective ports 21i, 21o and 21c so as to communicate the control pressure supplying port 21c with either the inlet port 21i or the drain port 21o. Both of the line pressure and the control pressure are applied to different pressure surfaces of the spool. In other worde, the line pressure and the control pressure serve as a pilot pressure utilized for controlling a relative position of the spool relative to a valve housing of the pressure control valve. The pressure control valve employs a poppet valve slidingly moved in the valve housing by means of an electromagnetic solenoid, so as to variably adjust fluid pressure to be introduced into a pilot chamber defined between the spool and the valve housing. The control pressure supplying port 21c is connected to the associated pressure chamber of the respective cylinders 19FL–19RR. In these constructions, the respective control pressure output from each pressure control valves 13FL–13RR is controlled in an essentially linear fashion in response to either one of the respective exciting currents $I_{FL}$, $I_{FR}$, $I_{RL}$ and $I_{RR}$ output from the controller 42 as herebelow detailed.

Figure 2:
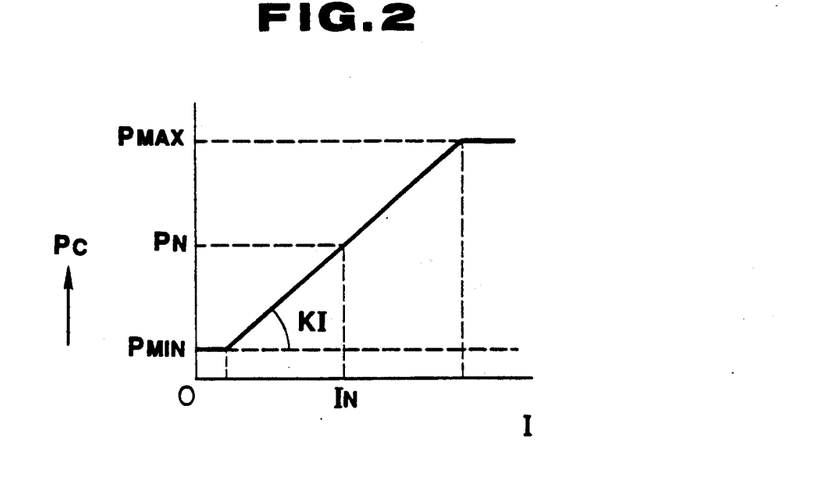
FIG. 2 is a graph illustrating variation of a control pressure of a pressure control valve in relation to a control current value thereto.

As seen in FIG. 2, the pressure control valve generates a minimum control pressure $P_{MIN}$ when the exciting current serving as a control signal is in the vicinity of 0. Under this condition, when the exciting current is increased in a positive direction, the control pressure Pc is increased with a predetermined gain $K_I$. Thereafter, when the exciting current is subsequently increased, the control pressure Pc reaches the line pressure $P_H$ corresponding to a maximum control pressure $P_{MAX}$. As set forth above, the solenoid employed in each pressure control valves 13FL–13RR functions as a proportioning solenoid in which the control pressure is essentially in proportion to the exciting current value.

Returning to FIG. 1, a pressure accumulator 31F is connected to a return line 30F communicating the port B of the fail-safe valve 12 and both drain ports 21o of the front side pressure control valves 13FL and 13FR, so as to absorb back-pressure caused by flow resistance in the return line 30F. A pressure accumulator 31R is connected to a return line 30R communicating the port B and both drain ports 21o of the rear side pressure control valves 13RL and 13RR, so as to absorb back-pressure caused by flow resistance in the return line 30R. In addition, a pressure accumulator 34 is connected through a variable throttling orifice 31 to the pressure chamber 20 of each hydraulic cylinders 19FL–19 RR. Both of the pressure accumulator 34 and the orifice 31 serve for absorbing pressure fluctuation in the hydraulic cylinder and for damping movement of the piston of the hydraulic cylinder and for absorbing high frequency and low amplitude vibration induced by road shock. A pressure accumulator 35F is connected to the supply line disposed between the port A of the fail-safe valve 12 and the inlet ports 21i of the front side pressure control valves 13FL and 13FR. A pressure accumulator 35R is connected to the supply line disposed between the port A and the inlet ports 21i of the rear side pressure control valves 13RL and 13RR. Two check valves 36F and 36R are provided for releasing abnormally high pressure generated in the return line 7 to the supply line 5. An orifice 37 is also provided for keeping back-pressure occurring in the return lines 7, 30F and 30R to a approximately 5 kgf/cm².

Figure 3:
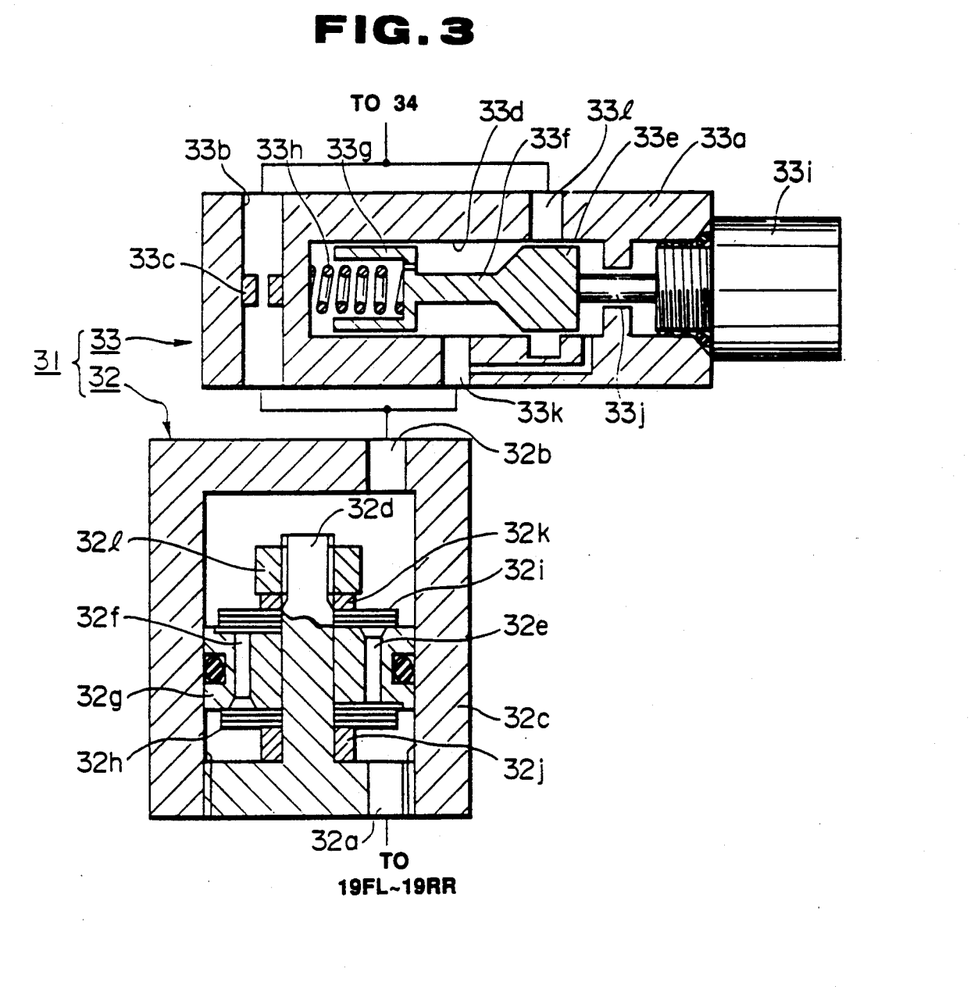
FIG. 3 is a sectional view illustrating one embodiment of a variable throttling orifice employed in the active suspension system according to the invention.

As seen in FIG. 3, the variable throttling orifice 31 is comprised of a damping valve 32 having a fixed damping characteristics suitable for damping pressure fluctuation at around a resonance frequency for an unsprung mass (corresponding to a suspension member) and a variable throttling valve 33 serving as a two-position valve employing an orifice. The valve 33 acts in an offset position wherein a superior damping characteristics is provided by the employed orifice and in a normal position corresponding to a full open state wherein full fluid communication is established. As clearly shown in FIG. 3, the damping valve 32 comprises a substantially cylindrical housing 32c formed with two ports 32a and 32b at both ends of the housing 32c, a center shaft 32d firmly secured in the housing 32c, and a disc plate 32g formed with two orifices 32e and 32f. The disc plate 32g is fitted and fixed to the substantially midst of the shaft 32d such that a washer 32j, a disc valve 32h, the disc plate 32g, a disc valve 32i and a washer 32k are inserted to the shaft 32d in that order and thereafter these elements are secured to the shaft 32d by means of a nut 32l. The flow restriction characteristics of the damping valve 32 is determined to generate damping force sufficient to suppress pressure fluctuation occurring in the hydraulic cylinders 19FL –19RR due to vibration (at around a resonance frequency for an unsprung mass) input from the suspension member.

On the other hand, the variable throttling valve 33 comprises a substantially cylindrical housing 33a formed with a fluid passage 33b bored in a radial direction of the housing 33a, and an orifice 33c employed in a substantially center of the fluid passage 33b. The throttling valve 33 also includes a spool 33f slidingly provided in a center bore section 33d bored in an axial direction of the housing 33a. As seen in FIG. 3, the spool 33f is formed with a land 33e and a cylindrical portion 33g opposing to each other. A return spring 33h is disposed between the housing 33a and the cylindrical portion 33g. The tip end of the land 33e comes into contact with an actuator 33j of a solenoid 33i. A port 33k opposing a relatively small diameter section of the spool 33f is formed in the side wall of the housing 33a. A port 33l is formed in the side wall of the housing 33a in such a manner as to oppose the land 33e. One end of the fluid passage 33b and the port 33k with the port 32b of the damping valve 32. The other end of the fluid passage 33b and the port 33l communicate with the accumulator 34. Under this construction, when the solenoid 33i is deactivated, the spool 33f is biased in the right direction (viewing FIG. 3) by the return spring 33h and consequently the two ports 33k and 33l communicate with each other. As a result, the damping valve 32 communicate with the accumulator 34 through a path not including the orifice 33c. Conversely, when the solenoid 33i is activated, the spool 33f is held in a leftmost position as seen in FIG. 3. As a result, the port 33l is blocked by the land 33e and consequently the damping valve 32 communicate with the accumulator 34 through the orifice 33c.

Furthermore, the active suspension system of the preferred embodiment comprises an abnormal condition detection device 39 for monitoring an abnormal condition in relation to the proportioning solenoids for the pressure control valves 13FL–13RR or an electric power source system so as to generate an abnormal condition detection signal AS representative of the abnormal condition. The suspension system of the embodiment includes various sensors for monitoring a vehicular body attitude change. For example, these sensors are a lateral acceleration sensor 40 for monitoring a lateral acceleration of the vehicle and generating a lateral acceleration indicating signal $Y_G$ and a longitudinal acceleration sensor 41 for monitoring a longitudinal acceleration of the vehicle and generating a longitudinal acceleration indicating signal $X_G$. The aforementioned signals AS, $Y_G$ and $X_G$ are supplied to the controller 42. As a lateral acceleration indicating signal $Y_G$, the sensor 40 outputs a voltage 0 when the lateral acceleration exerted on the vehicle is 0 and outputs a positive voltage in proportion to magnitude of the lateral acceleration exerted on the vehicle when the left-hand steering operation is performed, and outputs a negative voltage in proportion to magnitude of the lateral acceleration in the right-hand steering. Likewise, as a longitudinal acceleration indicating signal $X_G$, the sensor 41 outputs a voltage 0 when the longitudinal acceleration exerted on the vehicle is 0, and outputs a positive voltage in proportion to magnitude of the longitudinal acceleration during acceleration of the vehicle, and outputs a negative voltage in proportion to magnitude of the longitudinal deceleration during deceleration of the vehicle.

Figure 4:
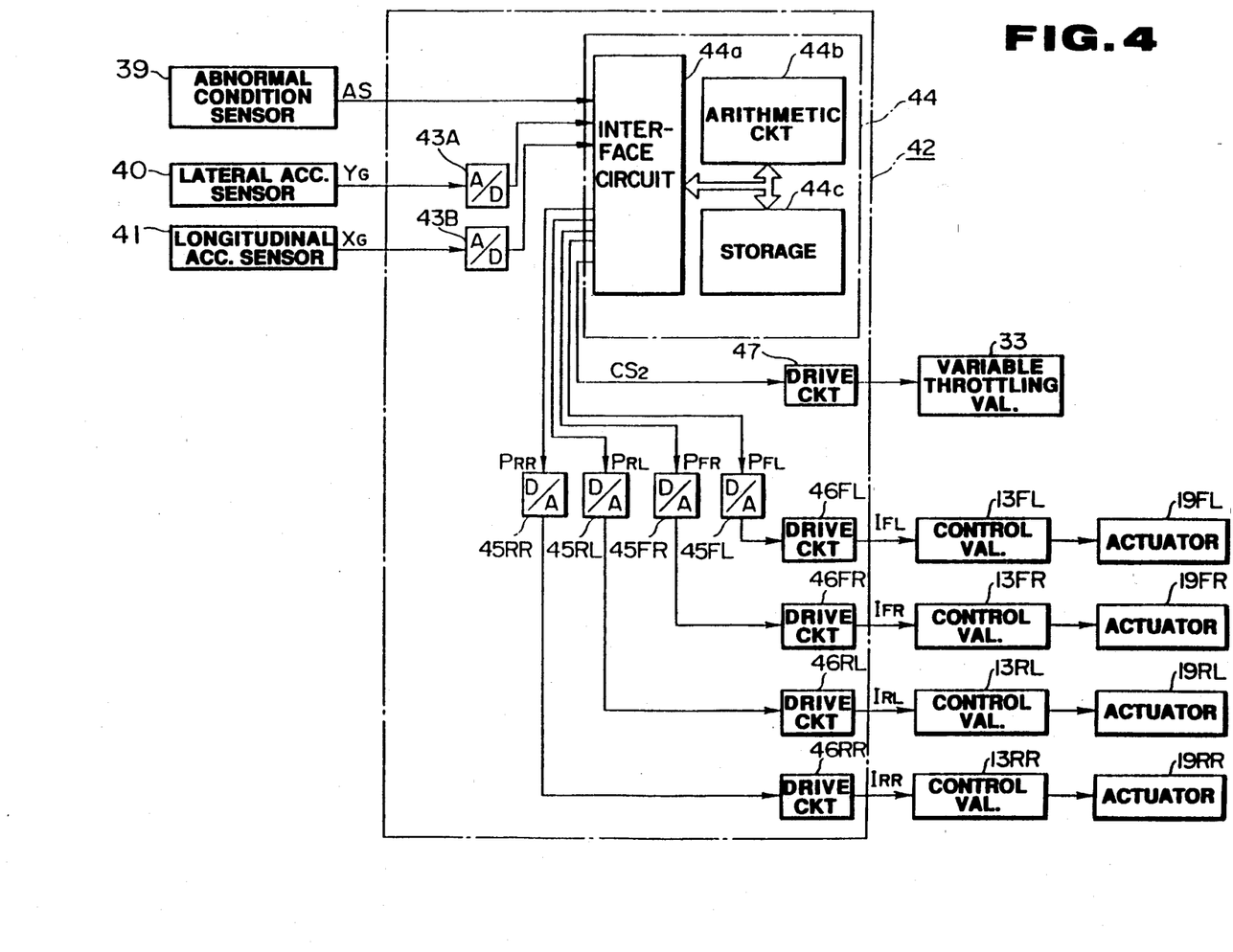
FIG. 4 is a block diagram illustrating one embodiment of a controller employed in the suspension system according to the invention.

As shown in FIG. 4, the controller 42 comprises a microcomputer 44 for generating command signals for the respective pressure control valves 13FL-13RR and analogue-to-digital converters 43A and 43B respectively converting the lateral acceleration indicating signal $Y_G$ and the longitudinal acceleration indicating signal $X_G$ to digital values. The controller 42 includes driving circuits 46FL, 46FR, 46RL and 46RR receiving the command signals from the microcomputer 44 through digital-analogue converters 45FL, 45FR, 45RL and 45RR. The controller 42 also includes a driving circuit 47 receiving a control signal $CS_2$ for the solenoid 33i of the variable throttling valve 33 from the controller 42. The exciting currents $I_{FL}$-$I_{RR}$ output from each of the driving circuits 46FL-46RR are applied to the corresponding solenoids of pressure control valves 13FL-13RR. On the other hand, the exciting current output from the driving circuit 47 is applied to the solenoids 33i of the orifice 33.

In the embodiment, the microcomputer 44 includes an interface circuit 44a, an arithmetic circuit 44b and a storage 44c. The input terminals of the interface circuit 44a receive both digitized lateral acceleration value and digitized longitudinal acceleration value. The interface circuit 44a outputs the command signals for pressure control valves 13FL-13RR and the control signals for the variable throttling valves 33 through its output terminals. The arithmetic circuit 44b outputs command signals for the pressure control valves on the basis of the lateral acceleration value and the longitudinal acceleration value, input in the interface circuit 44a, for suppressing vehicular attitude change, such as rolling and pitching, in accordance with a control procedure illustrated by the flow chart of FIG. 5. The arithmetic circuit 44b determines a transient oscillating state of the vehicular body and the degree of the transient oscillating state on the basis of the lateral acceleration value and the longitudinal acceleration value and outputs the control signals for the variable throttling valves 33. The storage 44c memorizes a program required for an arithmetic procedure of the arithmetic circuit 44b and temporarily stores calculated values derived from the arithmetic circuit 44b.

The control procedure for suppressing the vehicular attitude change will be hereinafter described in detail in accordance with a flow chart shown in FIG. 5. The flow restriction control or throttling characteristics control for the variable throttling orifices 31 will be hereinafter detailed in accordance with the flow chart shown in FIG. 6.

Figure 5:
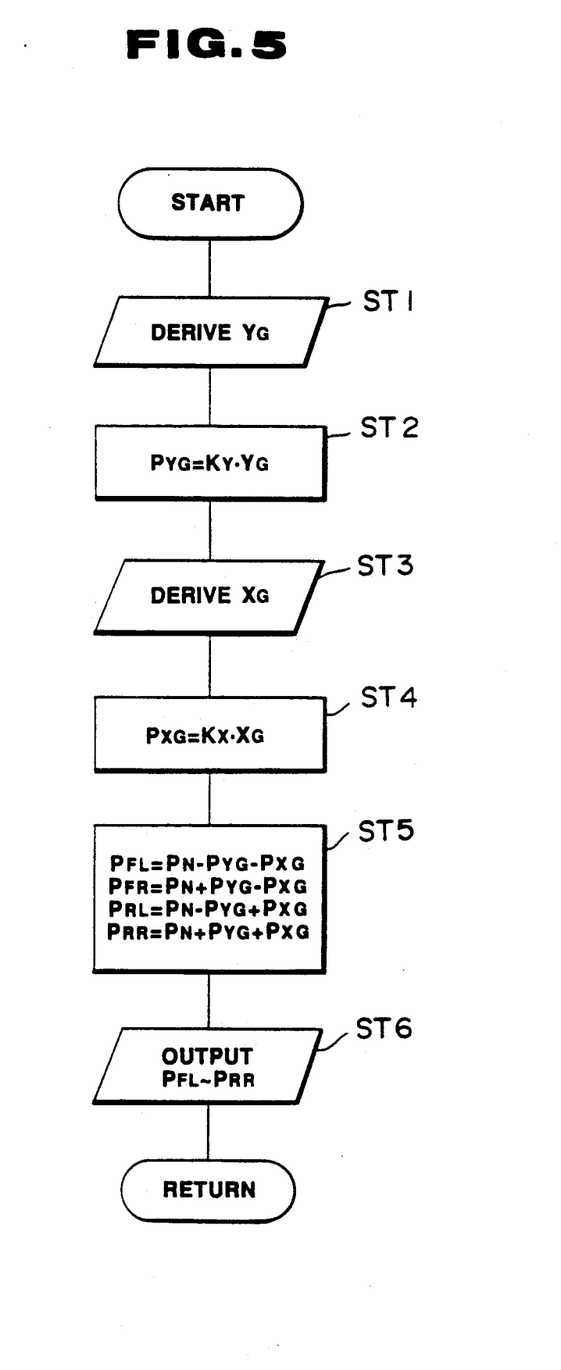
FIGS. 5 and 6 are flow charts respectively illustrating two different control procedures executed by the controller.
Figure 6:
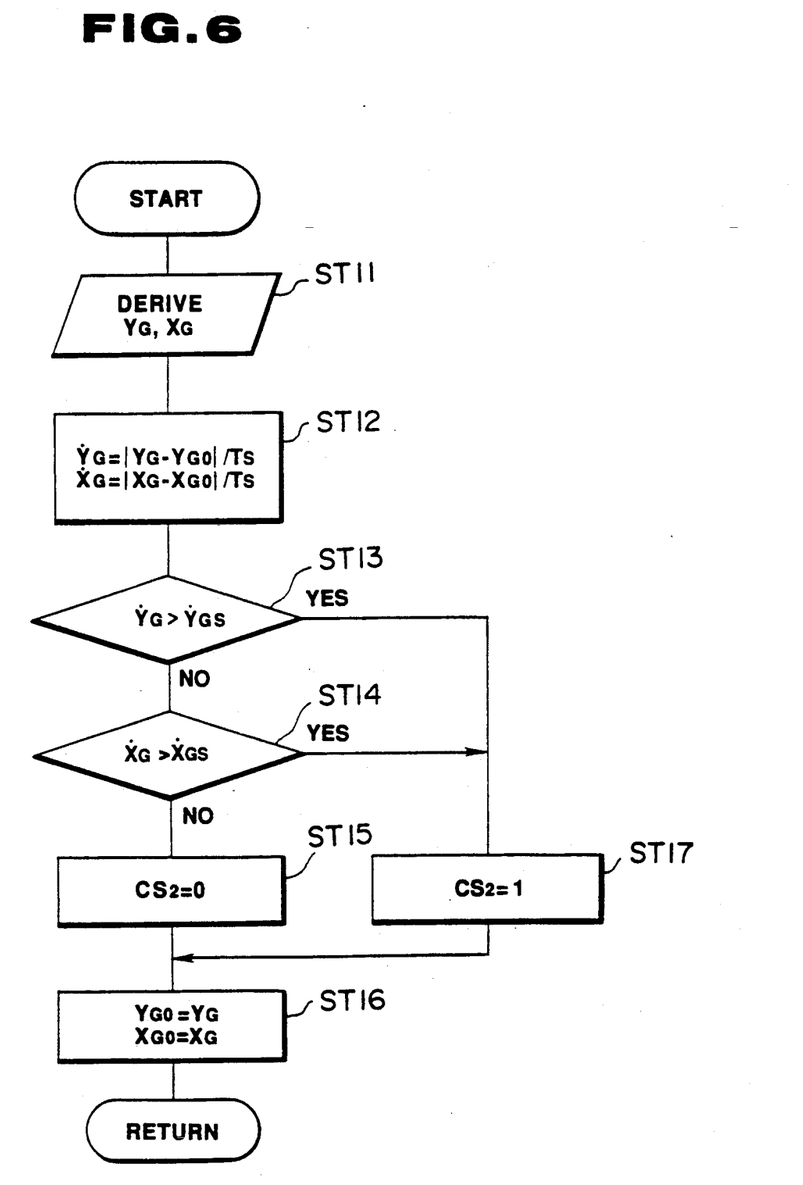

The controller 42 executes both control procedures shown in FIGS. 5 and 6, after an ignition switch is ON. At the beginning of the control procedure, each control signal and a current lateral acceleration value $Y_{GO}$ and a current longitudinal acceleration value $X_{GO}$ already stored in the storage 44c are initialized.

Referring now to FIG. 5, the vehicular attitude change dampening control procedure is executed every at a predetermined time interval, for example 10 msec, as an interruption handling.

In step 1, a lateral acceleration value $Y_G$ based on an output signal from the lateral acceleration sensor 40 is derived.

In step 2, a pressure control value $P_{YG}$ for suppressing rolling of the vehicular body is calculated by multiplying the lateral acceleration value $Y_G$ by a given gain $K_Y$. The pressure control value $P_{YG}$ is renewed in a predetermined address of the storage 44c.

In step 3, a longitudinal acceleration value $X_G$ based on an output signal from the longitudinal acceleration sensor 41 is derived.

In step 4, a pressure control value $P_{XG}$ for suppressing pitching of the vehicular body is calculated by multiplying the longitudinal acceleration value $X_G$ by a given gain $K_X$. The pressure control value $P_{XG}$ is renewed in a predetermined address of the storage 44c.

In step 5, pressure control values $P_{FL}$, $P_{FR}$, $P_{RL}$ and $P_{RR}$ for the respective pressure control valves 13FL-13RR are calculated on the basis of pressure control values $P_{YG}$ and $P_{XG}$ derived from the storage 44c according to the following equations (1), (2), (3) and (4).

$$P_{FL} = P_N - P_{YG} - P_{XG} \qquad (1)$$

$$P_{FR} = P_N + P_{YG} - P_{XG} \qquad (2)$$

$$P_{RL} = P_N - P_{YG} + P_{XG} \qquad (3)$$

$$P_{RR} = P_N + P_{YG} + P_{XG} \qquad (4)$$

wherein, $P_N$ is a constant corresponding to a neutral pressure required to maintain a standard vehicular height.

In step 6, the calculated pressure control values $P_{FL}$, $P_{FR}$, $P_{RL}$ and $P_{RR}$ are output to the respective digital-to-analogue converters 45FL-45RR. After step 6, the interruption handling is completed and the routine returns to a predetermined main program for an ordinary suspension control. In accordance with the previously noted vehicular attitude change dampening control, the vehicular attitude is effectively dampened by changes in fluid pressure in the pressure chambers of the hydraulic cylinders.

Referring to FIG. 6, the throttling characteristics for the variable throttling orifices 31 are controlled on the basis of the lateral acceleration value $Y_G$ and the longitudinal acceleration value $X_G$.

In step 11, a lateral acceleration value $Y_G$ and a longitudinal acceleration value $X_G$ are derived.

In step 12, both a rate of change in the lateral acceleration value $Y_G$ and a rate of change in the longitudinal acceleration value $X_G$ are calculated in accordance with the following equations (5) and (6).

$$\dot{Y}_G = |Y_G - Y_{GO}|/Ts \qquad (5)$$

$$\dot{X}_G = |X_G - X_{GO}|/Ts \qquad (6)$$

wherein, Ts is a predetermined time interval for the previously described interruption handling.

A transient oscillating state of the vehicle in the lateral direction and the degree of the transient oscillating state will be determined by the rate of change $\dot{Y}_G$ of the lateral acceleration value $Y_G$, and while a transient oscillating state of the vehicle in the longitudinal direction and degree of the transient oscillating state will be determined by the rate of change $\dot{X}_G$ of the longitudinal acceleration value $X_G$.

In step 13, a test is made to determine whether a rate of change $\dot{Y}_G$ in the lateral acceleration value exceeds a preset threshold $\dot{Y}_{GS}$. If the answer to step 13 is in the negative (no), step 14 proceeds in which a test is made to determine whether the change-rate $\dot{X}_G$ in the longitudinal acceleration value exceeds a preset threshold $\dot{X}_{GS}$. If the answer to step 14 is in the negative, step 15 proceeds in which a control signal $CS_2$ representative of a logical value "0" is output to the drive circuit 47 so as to deactivate the solenoids 33i of the variable throttling valves 33. Thereafter, step 16 enters in which the current lateral acceleration value $Y_{GO}$ and the current longitudinal acceleration value $X_{GO}$ are respectively renewed by new lateral acceleration value $Y_G$ and new longitudinal acceleration value $X_G$. In this manner, the interruption handling terminates and the routine returns to the main program.

On the other hand, if the answer to steps 13 or 14 is in the affirmative (yes), step 17 proceeds in which a control signal $CS_2$ representative of a logical value "1" is output to the drive circuit 47 so as to activate the solenoid 33i. Thereafter, step 16 proceeds.

The vehicular body attitude can be suitably controlled in accordance with the previously described control procedure of FIGS. 5 and 6. Both of the vehicular attitude change dampening control and the throttling characteristic controls are actually executed as follows:

With the ignition switch ON, while the vehicle is stationary, both of the acceleration values $Y_G$ and $X_G$ are 0. Therefore, if the vehicular attitude dampening control procedure is executed according to the flow chart of FIG. 5, the pressure control values $P_{YG}$ and $P_{XG}$ also become 0. As a result, the pressure control values $P_{FL}$–$P_{RR}$ have a neutral pressure control value $P_N$. A neutral exciting current $I_N$ is supplied to each of the proportioning solenoids for the response to the neutral pressure control 13FL–13RR in response to the neutral pressure control value $P_N$. That is, the neutral pressure is supplied through the control valves to the hydraulic cylinders 19FL–19RR with the result that a vehicular height is held at a standard level. Under the stopped state of the vehicle, if the throttling characteristic control procedure is executed according to the flow chart of FIG. 6, both of the change-rates $\dot{Y}_G$ and $\dot{X}_G$ become 0. The procedure is advanced from step 13 through step 14 to step 15. In step 15, since the control signal $CS_2$ having a logical value "0" is supplied to the drive circuit 47, the solenoids 33i are eeactivated. The spool 33f of the variable throttling valve 33 is kept in the normal position by spring force caused by the return spring 33h and as a result the ports 33k and 33l communicate with each other. One hydraulic circuit is established such that only the damping valve 32 is interposed between hydraulic cylinders 19FL–19RR and the accumulator 34.

When the vehicle body is changed from a stopped state to a running state, a longitudinal acceleration is exerted on the vehicular body. The longitudinal acceleration value $X_G$ is thus increased in the positive direction in response to the longitudinal acceleration occurring on the vehicle. In the vehicular attitude change suppressing control of FIG. 5, a pressure control value $P_{XG}$ for suppressing pitching of the vehicle becomes a positive value. As appreciated from the equations (1)–(4) utilized in step 4, the pressure control values $P_{FL}$ and $P_{FR}$ for the front side control valves 13FL and 13FR have a lower value than the neutral pressure control value by the value $P_{XG}$, while the pressure control values $P_{RL}$ and $P_{RR}$ for the rear side control valves 13RL and 13RR have a greater value than the neutral pressure control value by the value $P_{XG}$. As a result, fluid pressure in the pressure chambers of the front side hydraulic cylinders 19FL and 19FR is decreased and fluid pressure in the pressure chambers of the rear side hydraulic cylinders 19RL and 19RR is increased. In this manner, nose-up (wherein the front end of the vehicle body bounces up) and squat (wherein the rear side wheels of the vehicle dive) are effectively suppressed. In the throttling characteristics control of FIG. 6, as executed under a transient state from the vehicle stopped state to the vehicle running state, if the vehicle moderately starts, the longitudinal acceleration value $X_G$ becomes a small value and thus the change-rate $\dot{X}_G$ also becomes a small value as appreciated from the equation (6). The answer to step 14 is no and as a result the control signal $CS_2$ having a logical value "0" is held. A hydraulic circuit is established such that only the damping valve 32 is interposed between the hydraulic cylinder and the accumulator 34. Therefore, even if a relatively high frequency vibration (at around a resonance frequency for an unsprung mass) input from the suspension member due to uneven road surface is applied to the hydraulic cylinders 19FL–19RR and as a result pressure fluctuation in the pressure chambers of the cylinders occurs, the fluctuating pressure is transmitted through the damping valves 32 and the variable throttling valves 33 to the accumulator 34 with the result that the aforementioned pressure fluctuation is effectively absorbed by a damping force created by the damping valve 32. This assures both riding comfort and driving stability.

Conversely, when the vehicle quickly starts, the longitudinal acceleration value $X_G$ becomes extremely large and scud phenomena are created wherein rear wheels dive steeply. In such a transient oscillating state of the vehicle, when the throttling characteristics control for the variable throttling orifices are executed according to the control procedure of FIG. 6, an extremely large longitudinal acceleration value $X_G$ is derived in step 11 and the rate of change $\dot{X}_G$ in the longitudinal acceleration value becomes a great value. As appreciated from FIG. 6, the procedure is advanced from step 14 to step 17 and thus the solenoids 33i of the variable throttling valves 33 are activated. The spool 33f is moved from the normal position to the offset position with the result that the port 33*l* is blocked by the land 33*e*. The communication between the ports 33*l* and 33*k* is blocked. Therefore, the damping valve 32 and the orifice 33*c* are in series arranged between the hydraulic cylinder and the accumulator 34. For this reason, fluid resistance in the hydraulic circuit as previously noted becomes greater and thereby restricts flow rate of working fluid flowing into the accumulator 34. Fluid pressure in the rear side pressure control valves 13RL and 13RR is increased since the pressure control values $P_{RL}$ and $P_{RR}$ for the rear side pressure control valves 13RL and 13RR are increased according to increasing of the longitudinal acceleration value $X_G$ as appreciated from the equations (3) and (4) and thus increased exciting currents are applied to the solenoids for the rear side pressure control valves. In this manner, when the fluid pressure in the pressure chambers of the rear side hydraulic cylinders 19RL and 19RR are increased according to the control procedure of FIG. 5, such an increasing in fluid pressure in the pressure chamber of the hydraulic cylinder is rapidly achieved because the flow rate of working fluid flowing into the accumulator 34 is restricted or decreased due to increasing in the fluid resistance created by the damping valve 32 and the orifice 33*c* connected in series to each other. Therefore, pressurized working flow is effectively introduced into the pressure chambers of the hydraulic cylinders 19RL and 19RR. As set forth above, the active suspension system according to the invention has a high responsiveness for a vehicular attitude change suppressing control and thereby quickly prevents pitching mode, such as scud of the vehicle.

Since the rate of change $\dot{X}_G$ in the longitudinal acceleration value $X_G$ becomes a small value again if the previously noted transient state of the vehicle body terminates, the control procedure is advanced from step 14 to step 15 and therefore the solenoids 33*i* are deactivated. As a result, the spool 33*f* of the variable throttling valve 33 is returned to the normal position and thus the ports 33*l* and 33*k* are communicated to each other, thereby decreasing fluid resistance in the hydraulic circuit including the variable throttling orifice 31. Under these conditions, when the input vibration due to uneven road surfaces is transmitted to the hydraulic cylinders 19FL–19RR and a relatively high frequency pressure fluctuation occurs in the pressure chambers of the hydraulic cylinders, the pressure fluctuation is effectively absorbed by the damping valve 32.

Conversely, even if the vehicle is changed from the running state to the stopped state, nose-dive phenomena of the vehicle is effectively suppressed according to the vehicular attitude change suppressing control of FIG. 5. In addition, the vehicular attitude change suppressing control of FIG. 5 can be executed with a high responsiveness in such a transient state of the vehicular attitude change with the aid of the throttling characteristics control of FIG. 6.

Under a running state of the vehicle at a constant speed, when the right-hand or left-hand steering operation is performed, a lateral acceleration is exerted on the vehicle due to leftward or rightward centrifugal force. The controller 42 derives a lateral acceleration value $Y_G$ on the basis of an output signal from the lateral acceleration sensor 40. For example, when the vehicle turns at a relatively low speed or turns at a relatively high speed with a relatively large turning radius, the lateral acceleration value $Y_G$ becomes small. Under this condition, the change-rate $\dot{Y}_G$ in the lateral acceleration also becomes small. Therefore, the control procedure of FIG. 6 is advanced from step 13 to step 14. Since the longitudinal acceleration $X_G$ is substantially 0 in a vehicle running state of the vehicle at a constant speed, step 15 proceeds wherein a control signal $CS_2$ having a logical value "0" is output. This causes deactivation of the solenoids for the variable throttling valves 33. Therefore, the valves 33 are held in normal positions.

Conversely, when a quick steering operation is performed in a running state of the vehicle at a high speed, the lateral acceleration value $Y_G$ is steeply increased and as a result the rate of change $\dot{Y}_G$ in the lateral acceleration becomes a larger value. The answer to step 13 is yes because the change-rate $\dot{Y}_G$ exceeds a predetermined threshold. The control procedure is advanced to step 17 wherein a control signal $CS_2$ having a logical value "1" is output to the solenoids 33*i*. This causes shifting of the variable throttling valve 33 to the offset position. A hydraulic circuit is established such that the damping valve 32 and the orifice 33*c* are arranged between the hydraulic cylinder and the accumulator 34 in series to each other. In a same manner as the previously noted pitching control operation, the controller 42 determines the pressure control value $P_{YG}$ for suppressing rolling of the vehicle. In this case, an increased pressure control value $P_{YG}$ is supplied by the controller to the outer wheel side pressure control valves 13FL and 13RL (or 13FR and 13RR). The control pressure for the pressure control valves 13FL and 13RL (or 13FR and 13RR) is steeply increased. This causes an increase in fluid pressure in the outer wheel side hydraulic cylinders 19FL and 19RL (or 19FR and 19RR) and anti-rolling effect for the vehicular body. At this time, since both of the damping valve 32 and the orifice 33*c* act in series to each other so as to restrict fluid flow in the hydraulic circuit, the flow rate of working fluid flowing into the accumulator 34 is restricted. Therefore, pressurized working fluid flow is effectively introduced into the pressure chambers of the hydraulic cylinders 19FL and 19RL (or 19FR and 19RR). As set forth above, the active suspension system according to the invention has a high responsiveness for a vehicular attitude change suppressing control and thereby quickly prevents transient rolling mode, such as a quick steering operation.

Since the change-rate $\dot{Y}_G$ in the lateral acceleration value $Y_G$ becomes a small value again if the previously noted transient state of the vehicle body terminates, the control procedure is advanced from step 14 to step 15 and therefore the solenoids 33*i* are deactivated. As a result, the ports 33*l* and 33*k* are communicated to each other, thereby decreasing fluid resistance in the hydraulic circuit including the variable throttling orifice 31. Under these conditions, when the input vibration due to uneven road surfaces is transmitted to the hydraulic cylinders 19FL–19RR and a relatively high frequency pressure fluctuation occurs in the pressure chambers of the hydraulic cylinders, the pressure fluctuation is effectively absorbed by the damping valve 32.

As will be appreciated from the above, in a relatively low frequency vibration mode, such as a rolling mode, a pitching mode or the like, both of the damping valve 32 and the orifice 33*c*, serving as a variable flow restricting device, are in series arranged between the hydraulic cylinder and the accumulator 34, so as to increase fluid resistance in a hydraulic circuit including the variable throttling orifice. The flow rate of working fluid flowing into the accumulator 34 is forcibly restricted. Therefore, even at a relatively low frequency input vibration, a vehicular body attitude change suppressing control is performed with a high responsiveness at the aid of the variable flow restriction device.

Figure 7:
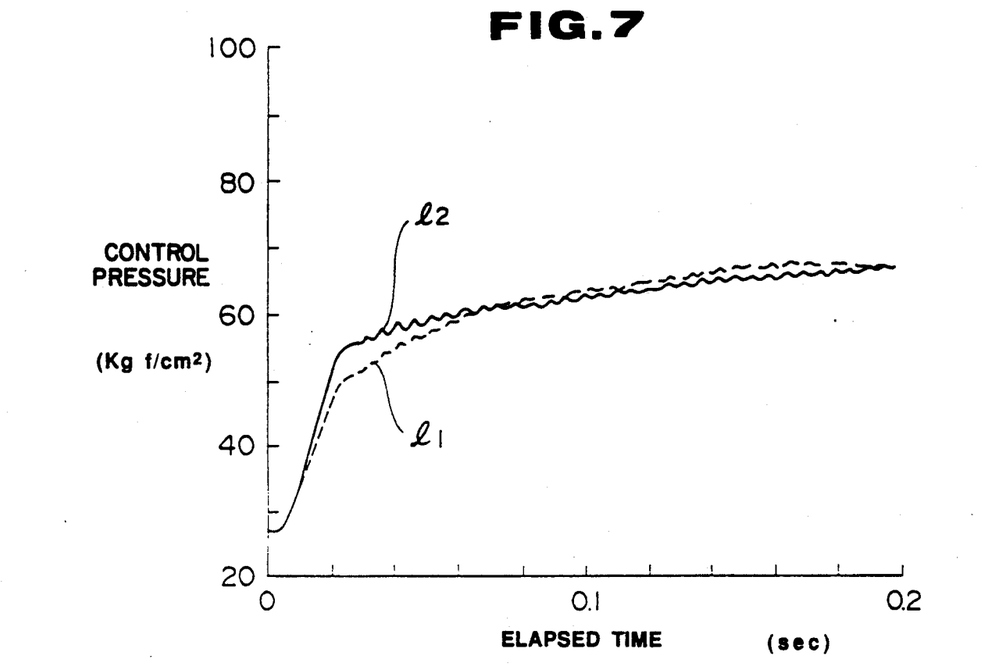
FIG. 7 is a graph illustrating the control pressure characteristics in relation to the elapsed time.
Figure 8:
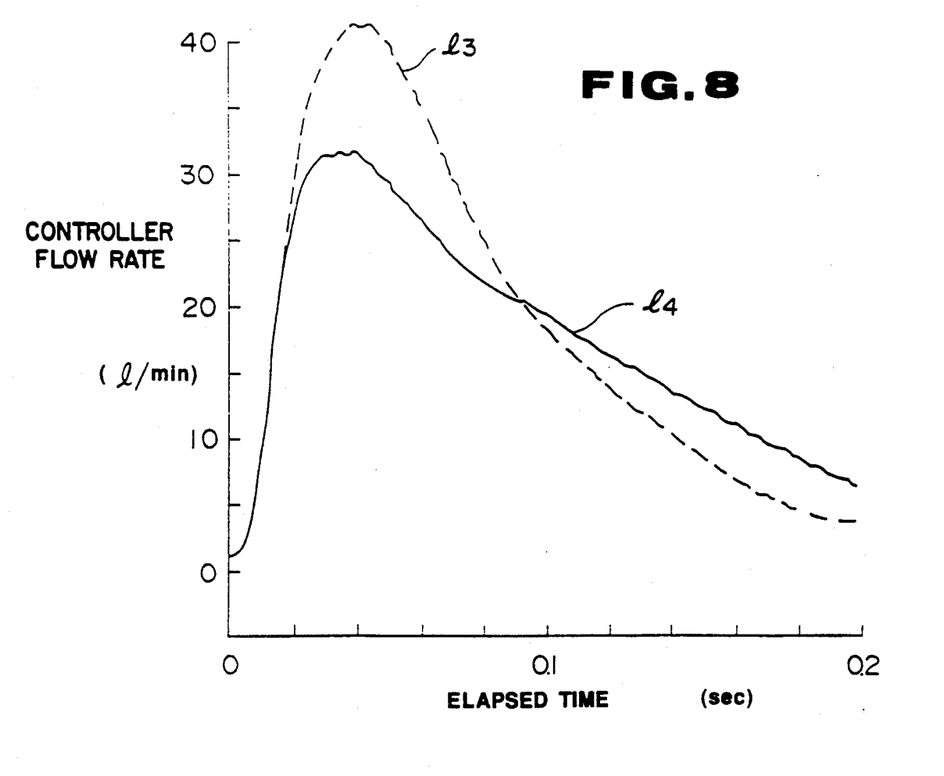
FIG. 8 is a graph illustrating a fluid flow varied by the variable throttling orifice in relation to the elapsed time.

As seen in FIGS. 7 and 8, the aforementioned control characteristics of the active suspension system according to the invention have been experimentally determined by the inventors of the present invention.

Referring now to FIG. 7, a broken line represents a characteristic curve $l_1$ illustrating the variation of a control pressure output from the control valve in a conventional active suspension system having a fixed throttling orifice interposed between a pressure accumulator and a pressure chamber of a hydraulic cylinder, while a solid line represents a characteristic curve $l_2$ illustrating the variation of a control pressure of an improved active suspension system of the invention. As appreciated from the characteristic curves of FIG. 7, increasing the control pressure created by the active suspension system of the invention is superior to that of the prior art active suspension system. That is, the active suspension system of the invention exhibits an enhanced step-response characteristic in a transient state wherein a vehicular body attitude change occurs.

Referring now to FIG. 8, a broken line $l_3$ represents a fluid flow rate characteristic of the conventional active suspension system, while a solid line $l_4$ represents a fluid flow rate characteristic of the invention. As appreciated from FIG. 8, in a transient state of a vehicular body attitude change, a controlled fluid flow rate of the conventional active suspension system becomes great due to a relatively large magnitude of fluid flow introduced into the pressure accumulator. In the active suspension system of the invention, the controlled fluid flow rate is minimized, thereby resulting in an economical hydraulic circuit employed in the active suspension system of the invention.

When the vehicle is stopped and the ignition switch is turned OFF, the engine 2 is stopped and consequently working fluid pressure of the fluid pressure supplying system FS is lowered. When working fluid pressure between the fail-safe valve 12 and the pressure control valves 13FL-13RR becomes less than a preset pressure of the pilot operated check valve 16, the check valve 16 is held in a fully closed state. As a result, a fluid pressure system including the pressure control valves 13FL-13RR and the hydraulic cylinders 19FL-19RR becomes a closed loop circuit so as to prevent fluid pressure in the hydraulic cylinders from lowering. That is, a rapid vehicular body attitude change is prevented by the pilot operated check valve 16 serving as a fail-safe device.

When an abnormal condition, such as breaking of wire or short-circuit occurs in the active suspension control system for actively controlling the pressure control valves 13FL-13RR, the previously described abnormal condition detection sensor 39 monitors such abnormal conditions of the electronic control system and generates an abnormal condition detection signal AS. On the basis of the abnormal condition detection signal AS, the controller 42 stops the output of the control signal $CS_1$ to the fail-safe valve 12, with the result that the fail-safe valve returns from the offset position to the normal position. As previously noted, the fail-safe valve 12 acting in the normal position is in a closed state. Under these condition, both inlet port $21i$ and drain port $21o$ for the pressure control valves 13FL-13RR are communicate with each other. Due to the communication between two ports $21i$ and $21o$, the pilot pressure $P_P$ for the pilot operated check valve 16 is lowered. When the pilot pressure $P_P$ becomes less than the preset pressure for the check valve 16, the pilot operated check valve 16 is held in a fully closed state as previously described in detail. In this manner, the vehicular body attitude change, for example sudden lowering of the vehicle height, is prevented by means of the fluid pressure maintaining section 11 including the fail-safe valve 12, the relief valve 15, and the pilot operated check valve 16.

Although, in the aforementioned preferred embodiment of the active suspension system, a two-position valve is used as a variable throttling valve 33, another type orifices, such as a multi-stage orifice may be used so as to provide a higher step-response for the vehicular attitude change suppressing control of FIG. 5. Alternatively, another type throttling valve as herebelow described in detail may be utilized, in which its throttling characteristics is sequentially varied in response to magnitude of an exciting current applied to its solenoid and consequently its throttling ratio is adjusted in response to a lateral acceleration value $Y_G$ and a longitudinal acceleration value $X_G$, or its rates of change $\dot{Y}_G$ and $\dot{X}_G$.

A second embodiment of an active suspension system according to the invention is hereinbelow detailed in accordance with FIGS. 9 and 10.

Figure 9:
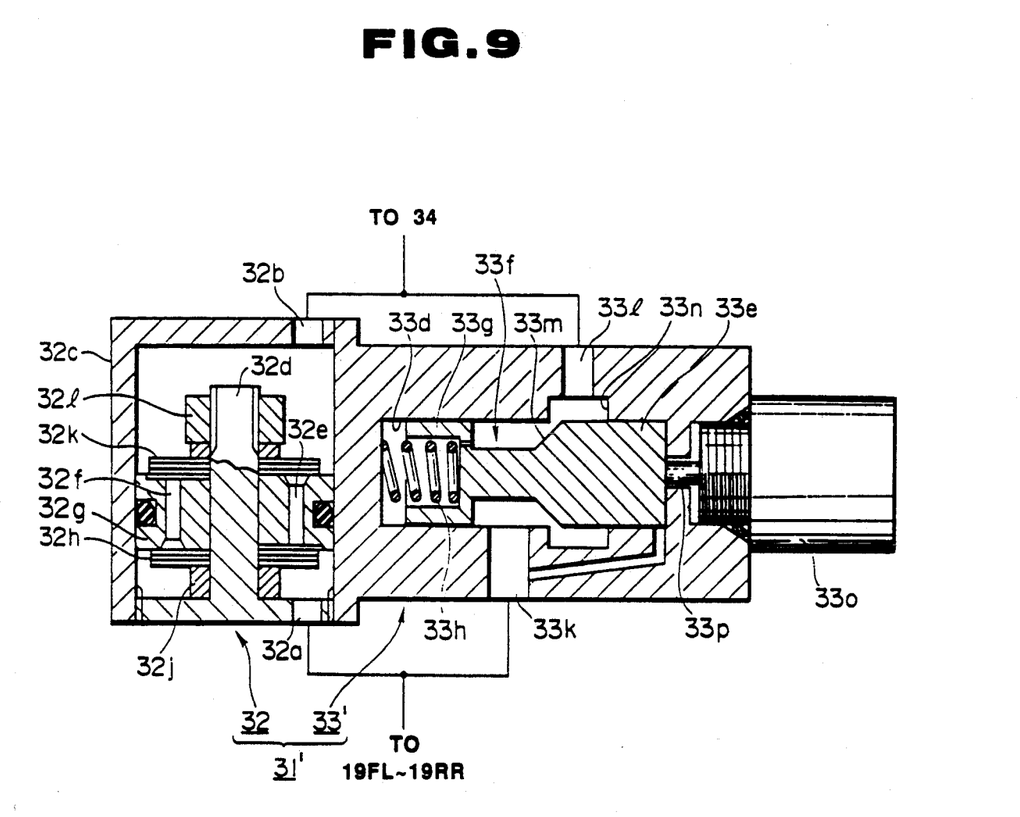
FIG. 9 is a sectional view illustrating another embodiment of the variable throttling orifice.

Referring now to FIG. 9, an active suspension system employs another type variable throttling orifice 31' interposed between the hydraulic cylinders 19FL-19RR and the pressure accumulator 34. The orifice 31' comprises the same damping valve 32 as used in the first embodiment and another type variable throttling valve 33' connected in parallel with the damping valve 32. A throttling ratio of the throttle valve 33' is sequentially variable. The construction of the orifice 31' of the second embodiment is similar to that of the orifice 31 of the first embodiment as shown in FIG. 3. For the purpose of simplification of description, the same reference numerals used in orifice 31 of FIG. 3 will be applied for the corresponding elements used in the embodiment of FIG. 9. The orifice 31' of the second embodiment as shown in FIG. 9 is different from the first embodiment as shown in FIG. 3 in that the fixed orifce 33c is not utilized and the damping valve 32 and the valve 33' are arranged in parallel with each other and a variable throttle is formed by a taper surface 33m of the land 33e and a substantially annular hollow 33n formed in the bore section 33d. The throttle ratio of the throttle is varied in accordance with a sliding movement of the spool 33f moved by a proportioning solenoid 33o which generates a biasing force in proportion to magnitude of the exciting current applied thereto. In this manner, the throttling characteristics of the valve 33' is sequentially varied in response to magnitude of the exciting current applied to the solenoid 33o. As clearly seen in FIG. 9, the damping valve 32 and the throttling valve 33' are arranged in parallel with each other such that the ports 32b and 33l are connected to each other and the ports 32a and 33k are connected to each other. The damping characteristics of the damping valve 32 is set at a high level than that of the damping valve 32 of FIG. 3, because of the parallel arrangement of two valves 32 and 33'. The throttling characteristics of the orifice 31' of the second embodiment is designed such that a combined throttling characteristics of the valves 32 and 33' utilized in the second embodiment is equivalent to a single throttling characteristics of the damping valve 32 utilized in the first embodiment, when the solenoid 33o is deactivated, i.e., the spool 33f is held in its rightmost position (viewing FIG. 9) by means of the return spring 33h. The above-mentioned variable throttling orifice 31' is operated in accordance with the flow chart shown in FIG. 10 as described herein below in detail.

Figure 10:
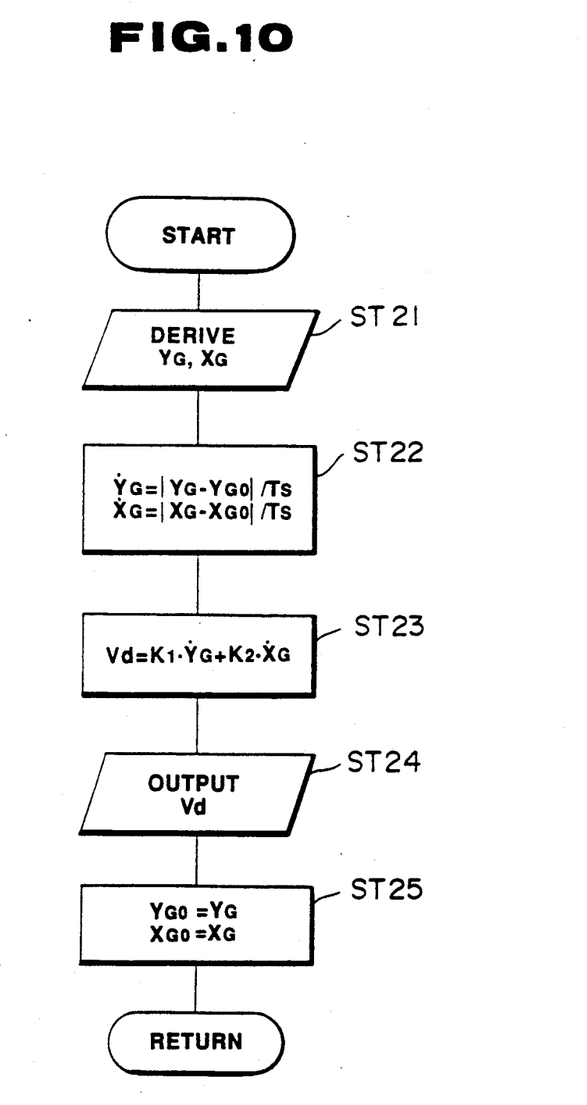
FIG. 10 is a flow chart illustrating another control procedure of the controller.

Referring now to FIG. 10, the procedure executed in steps 21 and 22 corresponds to that of steps 11 and 12 of FIG. 6. That is, through steps 11 and 12, the two change-rates $\dot{Y}_G$ and $\dot{X}_G$ are determined.

In step 23, a command signal value Vd applied to the solenoid 33o of the variable throttling valve 33' is calculated on the basis of the rates $\dot{Y}_G$ and $\dot{X}_G$ in accordance with the following equation (7).

$$Vd = K_1 \times \dot{Y}_G + K_2 \times \dot{X}_G \qquad (7)$$

wherein, $K_1$ and $K_2$ are constant.

In step 24, the calculated command signal value Vd is output through a digital-to-analogue converter to a drive circuit 47.

In step 25, current acceleration values $Y_{GO}$ and $X_{GO}$ stored in the storage 44c are respectively renewed by new lateral acceleration value $Y_G$ and new longitudinal acceleration value $X_G$. In this manner, the interruption handling terminates and the routine returns to the main program.

The vehicular body attitude can be suitably controlled in accordance with the previously described control procedure of FIGS. 5 and 10. Both of the vehicular attitude change suppressing control and the throttling characteristics control are concretely executed as follows:

When the vehicle is in a stopped state wherein the vehicle is completely stopped and a straight running state at a constant speed wherein the vehicle travels straight at a constant speed, both of the lateral acceleration value $Y_G$ and the longitudinal acceleration value $X_G$ are approximately zero and both of the rates of change $\dot{Y}_G$ and $\dot{X}_G$ are also approximately zero. Therefore, the command signal value Vd calculated in step 23 becomes approximately zero and as a result magnitude of the exciting current applied to the solenoid 33o becomes approximately zero. The spool 33f is held in a substantially rightmost position by means of the return spring 33h, with the result that the aperture of the throttle defined between the taper surface 33m and the annular hollow 33n is held at a substantially maximum, i.e., the throttling ratio is held at a substantially low level. Under this condition, the combined throttling characteristics of the orifice 31' is substantially equivalent to a single throttling characteristics of the damping valve 32 of the first embodiment. Therefore, both of the valves 32 and 33' absorbs and damps pressure fluctuation occurring at the hydraulic cylinders 19FL–19RR due to a relatively high frequency vibration transmitted from the road surface through the suspension member when the vehicle is a straight running state at a constant speed, thereby insuring optimal driving comfort in a straight running state at a constant speed.

On the other hand, when the vehicle is in an acceleration state or a deceleration state, a longitudinal acceleration $X_G$ is exerted on the vehicular body. The acceleration $X_G$ is detected by the sensor 41. Under the acceleration or deceleration state of the vehicle, the acceleration value is great and its rate of change $\dot{X}_G$ is also great. Therefore, the change-rate $\dot{X}_G$ and the command signal value Vd calculated in both of steps 22 and 23, become great. An exciting current having a magnitude based on a great change-rate $\dot{X}_G$ is applied to the proportioning solenoid 33o. The spool 33f is moved in the left direction in proportion to the magnitude of the current. A throttling ratio of the valve 33' becomes great and fluid flow therethrough is restricted, with the result that the combined throttling characteristics of the orifice 33' of the second embodiment becomes greater than the throttling characteristics of the damping valve 32 employed in the orifice 33 of the first embodiment. In this manner, fluid resistance in a hydraulic circuit defined between the accumulator 34 and the hydraulic cylinders 19FL–19RR can be sequentially increased in proportion to the magnitude of exciting current applied to the solenoid 33o. As appreciated from the above, when the pressure control valves 13FL–13RR are controlled in accordance with the vehicular attitude change suppressing control of FIG. 5, the control pressure supplied to each hydraulic cylinder 19FL–19R can be adjusted with a higher step-response characteristics. In the second embodiment, since the throttling ratio of the variable throttling valve 33' can be sequentially adjusted in response to magnitude of the change-rate $\dot{X}_G$ of the longitudinal acceleration or deceleration, the active suspension system of the second embodiment may provide a higher step-response characteristics in proportion to magnitude of an acceleration or deceleration of the vehicle. This causes a higher driving stability.

Under the running state of the vehicle, when the right-hand or left-hand steering operation is performed, the vehicle experiences rolling. The lateral acceleration $Y_G$ exerted on the vehicular body becomes great and the change-rate $\dot{Y}_G$ of the lateral acceleration also becomes great, with the result that the command signal value Vd calculated through steps 21, 22 and 23 becomes great. As a result, the throttling ratio of the variable throttling orifice 31' is increased and fluid resistance is thus increased. This causes a high step-response for the previously noted vehicular attitude change suppressing control of FIG. 5, executed for pressure control valves 13FL–13RR.

As will be appreciated from the above, in an active suspension system according to the present invention, a pressure accumulator is connected through a variable throttling orifice to the corresponding fluid operated actuator, such as a hydraulic cylinder, interposed between a vehicular body and a suspension member. The variable throttling orifice is operated in response to a control signal such that a throttling ratio of the variable throttling valve is increased depending on a rate of a vehicular body attitude change when the controller determines a transient oscillating state of the vehicle and the degree of the transient oscillating state on the basis of signals from sensors for monitoring the vehicular body attitude change. Fluid resistance in a hydraulic circuit including the pressure accumulator, the fluid operated actuator and the variable throttling valve, is increased in accordance with increasing in the throttling ratio so as to provide a high step-response for a control pressure output from the pressure control valve to the fluid operated actuator in the vehicular attitude change suppressing control executed by the controller. According to the previously noted second embodiment, the throttling ratio can be sequentially varied depended on the rate of the vehicular body attitude change so as to provide a higher step-response for the control pressure. On the other hand, in a stable vehicle running state, since the throttling ratio of the variable throttling valve is decreased, fluid resistance is decreased in the hydraulic circuit including the throttling valve so as to effectively absorb pressure fluctuation occurring in the fluid operated actuator due to a high frequency vibration (at around a resonance frequency for a sprung mass) input from the suspension member by the pressure accumulator and the variable throttling orifice. In this manner, a higher driving stability and an optimal riding comfort may be obtained according to both of the the vehicular attitude change suppressing control and the throttling characteristics control.

In the aforementioned embodiments, although a lateral acceleration sensor 40 and a longitudinal acceleration sensor 41 are used for monitoring an oscillating state of the vehicle or the vehicular body attitude change, another sensors may be used. For example, a stroke sensor interposed between the cylinder tube and the piston rod for each of the hydraulic cylinders 19FL–19RR may be used for monitoring a lateral acceleration of the vehicle, such that the lateral acceleration value is derived on the basis of a relative displacement between the cylinder tube and the piston rod by means of an arithmetic circuit. Alternatively, a steering angle sensor for monitoring a rotational angle of the steering wheel and a vehicle speed sensor may be combined for deriving or determining a lateral acceleration value. As appreciated, the previously noted stroke sensor may also be used for monitoring a longitudinal acceleration occurring on the vehicle in various pitching modes, such as nose-dive or nose-up. The oscillating state of the vehicle may be determined by rates of change of a brake fluid pressure, an opening angle of a throttling valve of the engine or so forth. The oscillating state of the vehicle, such as rolling or pitching, may be determined by four vertical acceleration sensors for monitoring upward and downward acceleration at the vehicular body positions corresponding to the respective front-left, front-right, rear-left and rear-rear wheels. The oscillating state of the vehicle may be determined by three vertical acceleration sensors provided on the vehicular body corresponding to three wheels and an arithmetic circuit for deriving a vertical acceleration at a vehicular body position corresponding to a remaining wheel on the basis of the monitored three acceleration values. Furthermore, two vertical acceleration sensors and a rolling rate sensor for monitoring shifting magnitude and shifting direction of the center of gravity of the vehicle body may be used for determining the four vertical acceleration values. In this case, the remaining two vertical acceleration values are calculated by an arithmetic circuit on the basis of the monitored two acceleration values and the rolling rate derived output derived from the rolling rate sensor. Moreover, one vertical acceleration sensor provided in a substantially center of gravity of the vehicle, the previously noted rolling rate sensor and a pitching rate sensor may be used for determining the four vertical acceleration values.

Although in the previously described embodiments, a transient oscillating state of the vehicle and the degree of the transient oscillating state is determined by the change-rates $\dot{Y}_G$ and $\dot{X}_G$, the transient oscillating state may be determined by the lateral and longitudinal acceleration values $Y_G$ and $X_G$.

Although in the previously noted embodiments, a variable throttling orifice is constructed by a damping valve and a variable throttling valve, such an orifice may be constructed by an only one variable throttling valve whose throttling ratio is sequentially variable in response to an exciting current from a proportioning solenoid.

Furthermore, a microcomputer 44 employed in the controller 42 may be replaced with an electronic circuit being comprised of an arithmetic circuit, a comparator, and so forth. A pressure control valve including an electromagnetic soelnoid valve may be replaced by a fluid flow control valve, such as a servo-valve. Fluid having low-compressibility, other than hydraulic oil may be used as working fluid.

In the embodiments, a pressure maintaining section 11 and a fail-safe valve 12 act commonly for pressure control valves 13FL–13RR. A plurality of pressure maintaining sections and fail-safe valves may act separately for each of the pressure control valves.

In the embodiments, an engine is used as a driving source for a hydraulic pump, an electric motor may be applied as such a driving source.

While the foregoing is a description of the preferred embodiments for carrying out the invention, it will be understood that the invention is not limited to the particular embodiments shown and described herein, but may include variations and modifications without departing from the scope or spirit of this invention as described by the following claims.

What is claimed is:

1. An actively controlled automotive suspension system comprising:
    a fluid pressure operated actuator disposed between a vehicle body and a suspension member pivotable mounted on the vehicle body and rotatably supporting a vehicle wheel, said fluid pressure operated actuator being filled with a working fluid;
    a pressurized fluid source connected to said fluid pressure operated actuator for supplying said working fluid in a pressurized fashion;
    a pressure accumulator connected to said fluid pressure operated actuator for reducing pressure fluctuations in said fluid pressure operated actuator;
    a variable throttling means, interposed between said pressure accumulator and said fluid pressure operated actuator, for variably restricting fluid flow in a hydraulic circuit between said pressure accumulator and said fluid pressure operated actuator;
    pressure control valve means connected to said fluid pressure operated actuator for adjusting fluid pressure in said fluid pressure operated actuator;
    sensor means for monitoring an acceleration experienced by the vehicle and causing a vehicular attitude change for generating an acceleration signal and;
    a controller for controlling said pressure control valve means and said sensor means and responsive to said acceleration signal for determining the magnitude of fluid pressure to be adjusted in a working fluid chamber of said fluid pressure operated actuator;
    said controller being connected to said variable throttling means for variably controlling a throttling ratio of said variable throttling means in response to said acceleration signal.

2. The actively controlled automotive suspension system as set forth in claim 1, wherein said variable throttling means comprises a two-position valve having a first fluid passage employing a fixed throttling orifice and a second fluid passage employing therein a spool valve, said spool valve being in a fully open position wherein full fluid flow through said second fluid passage is provided and in a fully closed position wherein fluid flow through said second fluid passage is blocked, and a fixed throttling valve connected to both of said first and second fluid passages.

3. The actively controlled automotive suspension system as set forth in claim 1, wherein said variable throttling means comprises a variable throttling valve for sequentially varying its throttling ratio and a fixed throttling valve connected to said variable throttling valve in parallel to each other.

4. The actively controlled automotive suspension system as set forth in claim 1, wherein said pressure control valve means includes an electromagnetic solenoid valve.

5. The actively controlled automotive suspension system as set forth in claim 1, wherein said sensor means comprises a lateral acceleration sensor for monitoring lateral acceleration of said vehicle body and a longitudinal acceleration sensor for monitoring longitudinal acceleration of said vehicle body.

6. The actively controlled automotive suspension system as set forth in claim 1, wherein said controller controls said throttling ratio in such a manner that said throttling ratio is held at a low level when said acceleration signal value is equal to or less than a predetermined threshold and said throttling ratio is held at a high level when said acceleration signal value exceeds said predetermined threshold.

7. The actively controlled automotive suspension system as set forth in claim 1, wherein said controller controls said throttling ratio in such a manner that said throttling ratio is sequentially varied in proportion to the magnitude of said acceleration signal value.

8. An actively controlled automotive suspension system comprising:

a fluid pressure operated cylinder disposed between a vehicle body and a suspension member pivotably mounted on the vehicle body and rotatably supporting a vehicle wheel, said cylinder being filled with a working fluid;

a pressurized fluid source connected to said cylinder for supplying said working fluid in a pressurized fashion;

a pressure accumulator connected to a working fluid chamber of said cylinder for reducing positive and negative pressure fluctuations in said cylinder;

a variable throttling orifice, interposed between said pressure accumulator and the working fluid chamber of said cylinder, for variably restricting fluid flow in a hydraulic circuit between said pressure accumulator and said cylinder;

a pressure control valve connected to said cylinder for adjusting fluid pressure in said cylinder;

sensors for monitoring a state of a vehicular attitude change to generate a vehicular change to generate a vehicular attitude change signal representative of both magnitude and direction of said vehicular attitude change;

a controller for controlling said pressure control valve and said sensors and responsive to said vehicular attitude change signal for determining the magnitude of fluid pressure to be adjusted in said working fluid chamber and for determining a degree of transient oscillating state of said vehicle body;

said controller connected to said variable throttling orifice for variably controlling a throttling ratio of said variable throttling orifice depending upon the determined degree of transient oscillating state;

said controller controlling said throttling ratio of said variable throttling orifice in such a manner as to maintain (a) said throttling ratio at a low level when a high frequency vibration which exceeds a predetermined frequency between a resonance frequency for a sprung mass of the vehicle and a resonance frequency for an unsprung mass of the vehicle is coupled to said cylinder, and (b) said throttling ratio at a high level when a low frequency vibration which is equal to or less than said boundary frequency is coupled to said cylinder.

* * * * *